United States Patent [19]
Ward

[11] Patent Number: 6,098,229
[45] Date of Patent: Aug. 8, 2000

[54] GRILL CLEANING APPARATUS

[76] Inventor: William Kevin Ward, 3570 Brookhill Cir., Marietta, Ga. 30062

[21] Appl. No.: 09/156,795

[22] Filed: Sep. 17, 1998

[51] Int. Cl.⁷ .................. B08B 1/00; B08B 3/00; A46B 11/00
[52] U.S. Cl. .................. 15/21.1; 15/77; 15/160; 134/186; 134/188
[58] Field of Search .......... 15/21.1, 77, 104.92, 15/160; 134/184, 186, 188; 401/4, 48, 193, 268

[56] References Cited

U.S. PATENT DOCUMENTS

| | | | |
|---|---|---|---|
| 772,822 | 10/1904 | Peterson | 15/21.1 |
| 3,761,984 | 10/1973 | Hauschild et al. | 15/77 X |
| 4,226,255 | 10/1980 | Tarrer | 134/117 |
| 4,486,911 | 12/1984 | Beke | 15/21.1 |
| 4,874,779 | 10/1989 | Zalevsky et al. | 15/104.92 |
| 4,917,124 | 4/1990 | Reasor | 134/186 X |
| 4,944,063 | 7/1990 | Jordan | 15/21.1 X |
| 5,035,516 | 7/1991 | Pacheco | 383/41 |
| 5,044,036 | 9/1991 | Fuimoto et al. | 15/77 X |

*Primary Examiner*—Mark Spisich
*Attorney, Agent, or Firm*—Eric R. Katz

[57] ABSTRACT

A grill cleaning apparatus is disclosed for cleaning a grill, the apparatus comprising: a container for storing and soaking the grill in a cleaning solution, the container having an openable top, a pair of side walls, a bottom extending between the side walls and a pair of end walls extending between and interconnecting the side walls; motor mounts within the container for removably receiving and holding a motor for circulating a cleaning solution within the container; a brush having a head with bristles and a handle; and a slide arrangement for sliding the brush along one side of the container and over the grill when stored within the container.

10 Claims, 4 Drawing Sheets

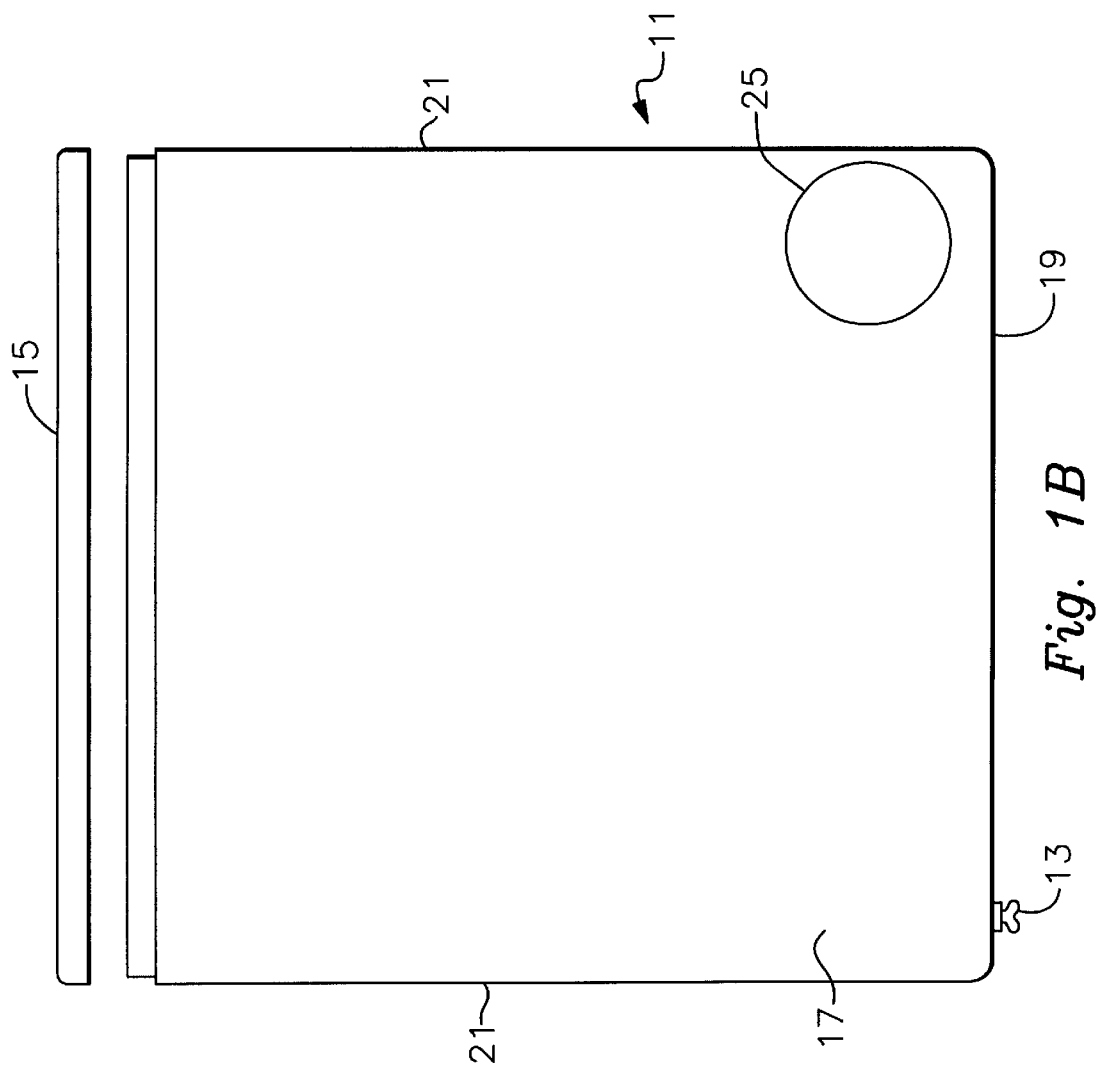
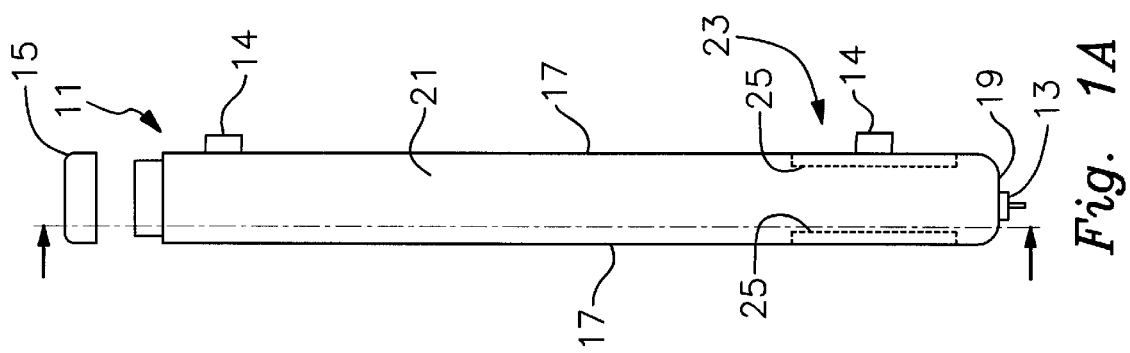

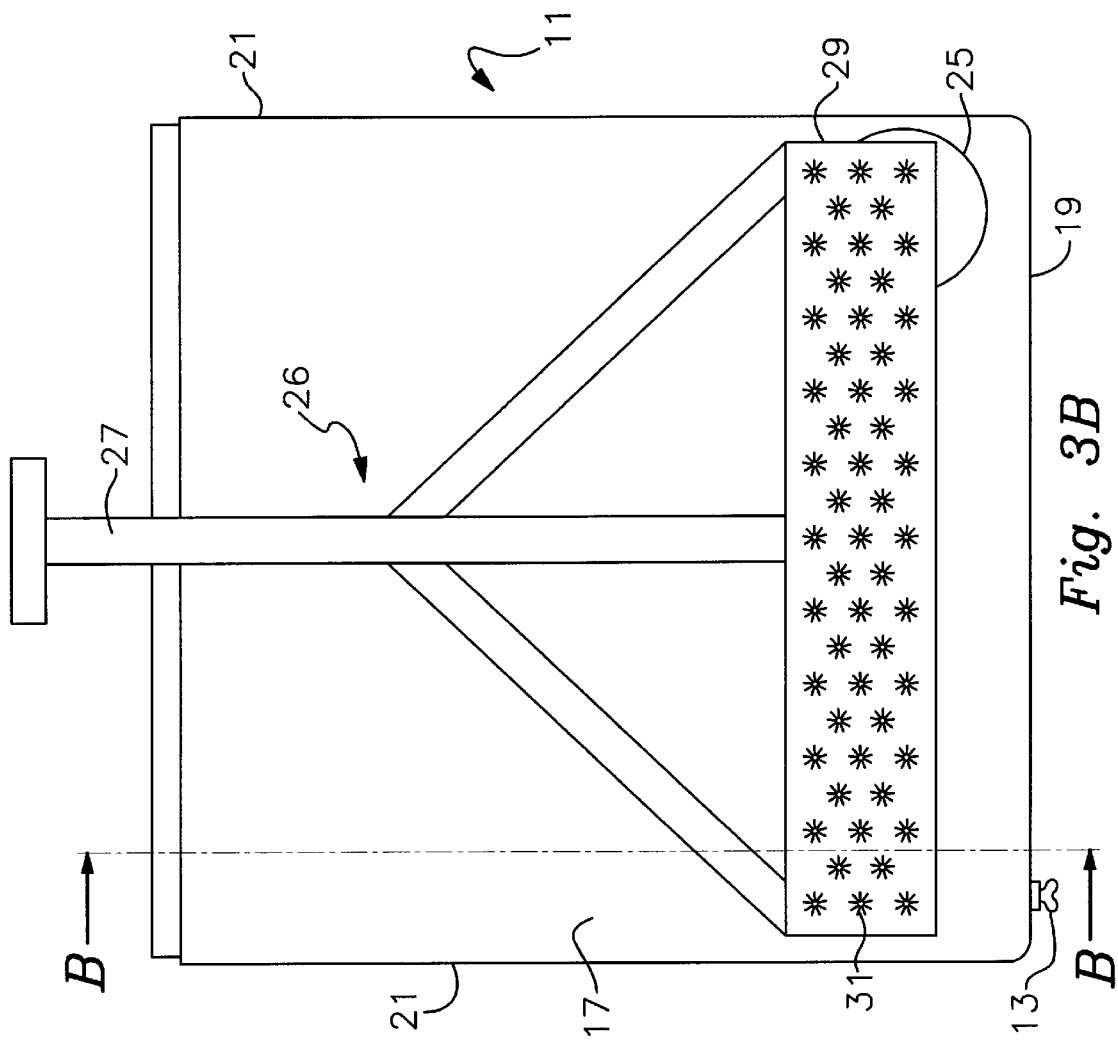
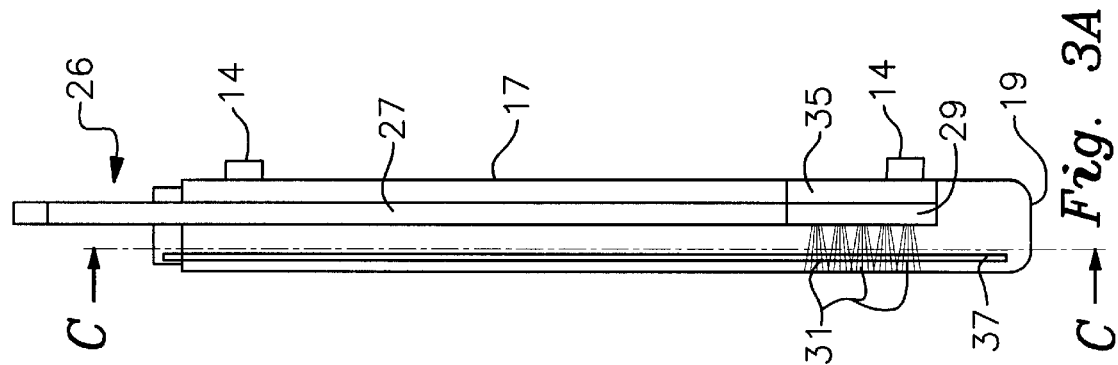
Fig. 3B
Fig. 3A

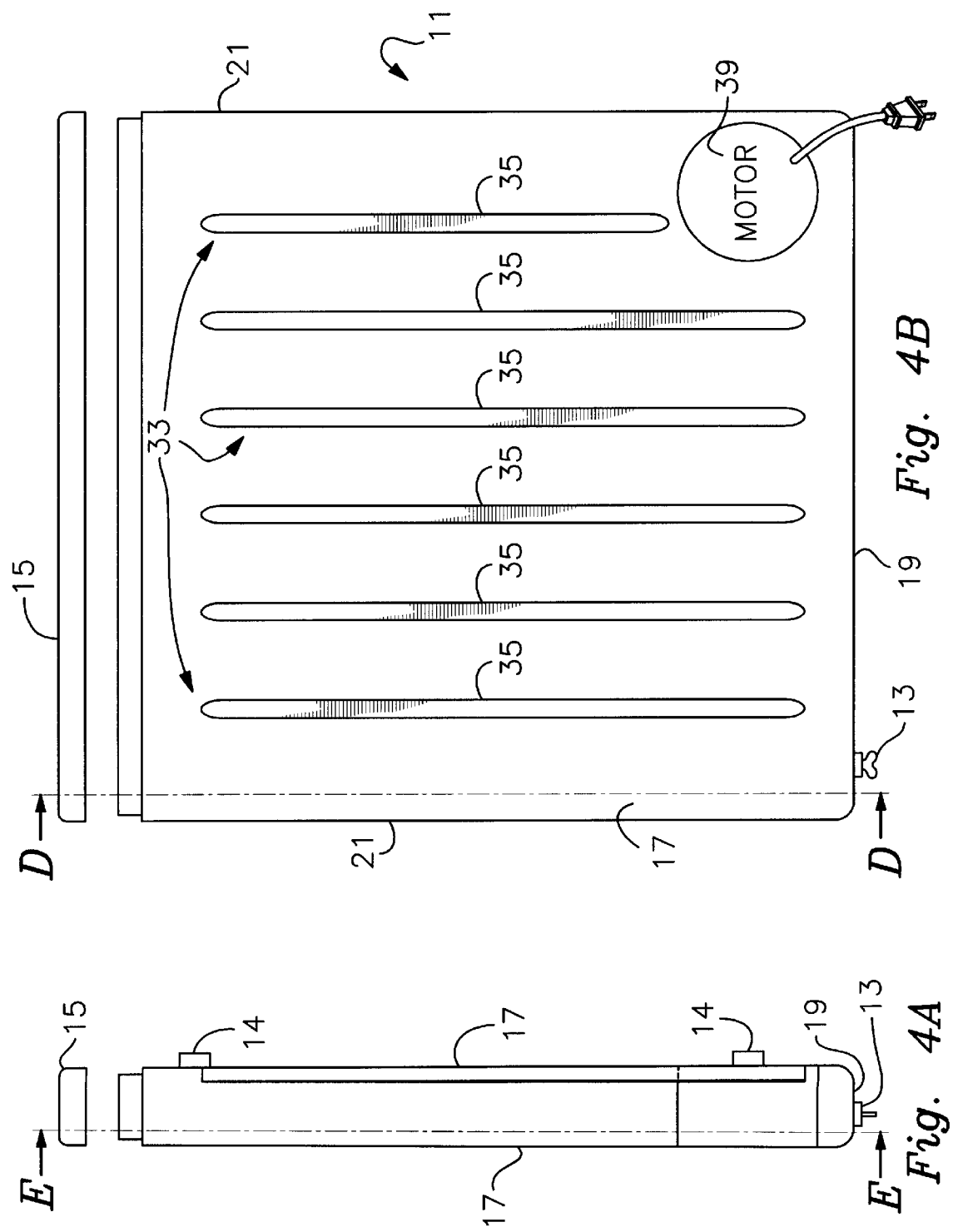

GRILL CLEANING APPARATUS

BACKGROUND OF THE INVENTION

1. Field of the Invention

The present invention generally relates to an apparatus for cleaning barbecue grills, and more particularly, to such an apparatus which permits a user to use different types of cleaning actions for quickly, effectively and easily removing the grease and baked on residues which typically reside on a barbecue grill after use.

2. Background Discussion

One of the main drawbacks to the use of outdoor barbecues is the effort necessary to insure that the grill or rack, on which the food is cooked, is clean and free of debris. A clean grill surface is essential to insure a sanitary cooking environment and pleasant tasting food.

Since the grill is subject to direct heat and smoke from burning charcoal or wood as well as grease from the cooking food, typically meat, the metallic surface of the grill becomes charred and coated with a thick layer of grime which is difficult to remove. If the grill is to be maintained in a spotless condition, it is necessary to remove the grill after every use and scrub it clean. If placed in a kitchen sink, the size of a typical grill makes it difficult to soak and further requires hand scrubbing which creates a mess around the sink area as well as subjecting the sink to scratching or marring from the grill. Common cleaning detergents, even those considered heavy duty, are often ineffective in removing charred residue clinging to the grill surface even after scrubbing with brushes, steel wool and the like.

It is generally known to provide containers having cleaning fluid disposed therein for soaking an article clean. For example, U.S. Pat. No. 4,226,255 to Tarrer, teaches the use of an imperforate container having an open top and including a cover. The container is provided with an attachment mechanism for hanging the container on or near the barbecue. The container is further adapted to contain a cleaning solution into which a removable barbecue grill or rack can be placed and soaked clean between periods of use.

U.S. Pat. No. 5,035,516 to Pacheco discloses the use of a disposable bag for cleaning outdoor barbecue grills in which a foaming cleaning solution, such oven cleaner, is sprayed into the bag to remove grease and residue from the grill surface. Thereafter, the grill is rinsed and the cleaning solution flushed from the bag.

While operationally efficient, the known arrangements for cleaning barbecue grills discussed above rely solely on the soaking action of the detergent solution to loosen and remove the residue from the grill. As a result, the grill is required to soak for a considerable amount of time before the cleansing action of the detergent becomes effective. This drawback becomes troublesome if the barbecue user has failed to place the dirty grill in the soaker after the prior use and now wants a clean grill. Moreover, extended soaking of the grill can result in rusting which effects both the taste of the food that is cooked on the grill as well as diminishing the operational lifetime of the grill.

SUMMARY OF THE INVENTION

Accordingly, it is an object of the present invention to provide a grill cleaning apparatus which permits the user to use a variety of different types of cleaning actions to quickly and effectively clean a dirty barbecue grill.

It is a further object of the present invention to provide a grill cleaning apparatus which is designed to permit the optional inclusion of a temporary detergent solution circulating motor which circulates the detergent solution around the grill to enhance the effectiveness of the soaking process.

It is yet another object of the present invention to provide a grill cleaning apparatus which includes a brush and slide arrangement for sliding the brush over the grill to scrub it clean while the grill is soaking in the detergent solution.

These and other objects, features and advantages of the present invention are achieved, according to one embodiment thereof, by a grill cleaning apparatus for cleaning a grill, the apparatus comprising: a container for storing and soaking the grill in a cleaning solution, the container having an openable top, a pair of side walls, a bottom extending between the side walls and a pair of end walls extending between and interconnecting the side walls. The container further includes a motor mount within the container for removably receiving and holding a motor for circulating a cleaning solution, such as, for example, dishwasher detergent, within the container at the discretion of the user. The cleaning apparatus also includes a brush having a head with bristles and a handle as well as a slide arrangement for sliding the brush along an interior side of the container and over the grill stored within the container to scrub the grill clean of baked on grease and grim.

BRIEF DESCRIPTION OF THE DRAWINGS

FIG. 1A is a side view of one embodiment of the container of the present invention;

FIG. 1B is a front sectional view, taken along line 1B—1B of the container of FIG. 1A;

FIG. 3A is a side, sectional view of the container, containing a grill to be cleaned and with the brush inserted into the container, taken along line 3A—3A of FIG. 3B;

FIG. 3B is a front, sectional view of the container, taken along line 3B—3B of FIG. 3A, with the brush inserted into the container; and FIG. 4A is a side, sectional view of the container, with the motor mounted therein, taken along line 4A—4A of FIG. 4B and illustrating a further embodiment of the present invention wherein the slide arrangement is provided on the container and FIG. 4B is front, sectional view of the container taken along line 4B—4B of FIG. 4A.

DETAILED DESCRIPTION OF THE PREFERRED EMBODIMENT(S)

Figures 2A, 2B:
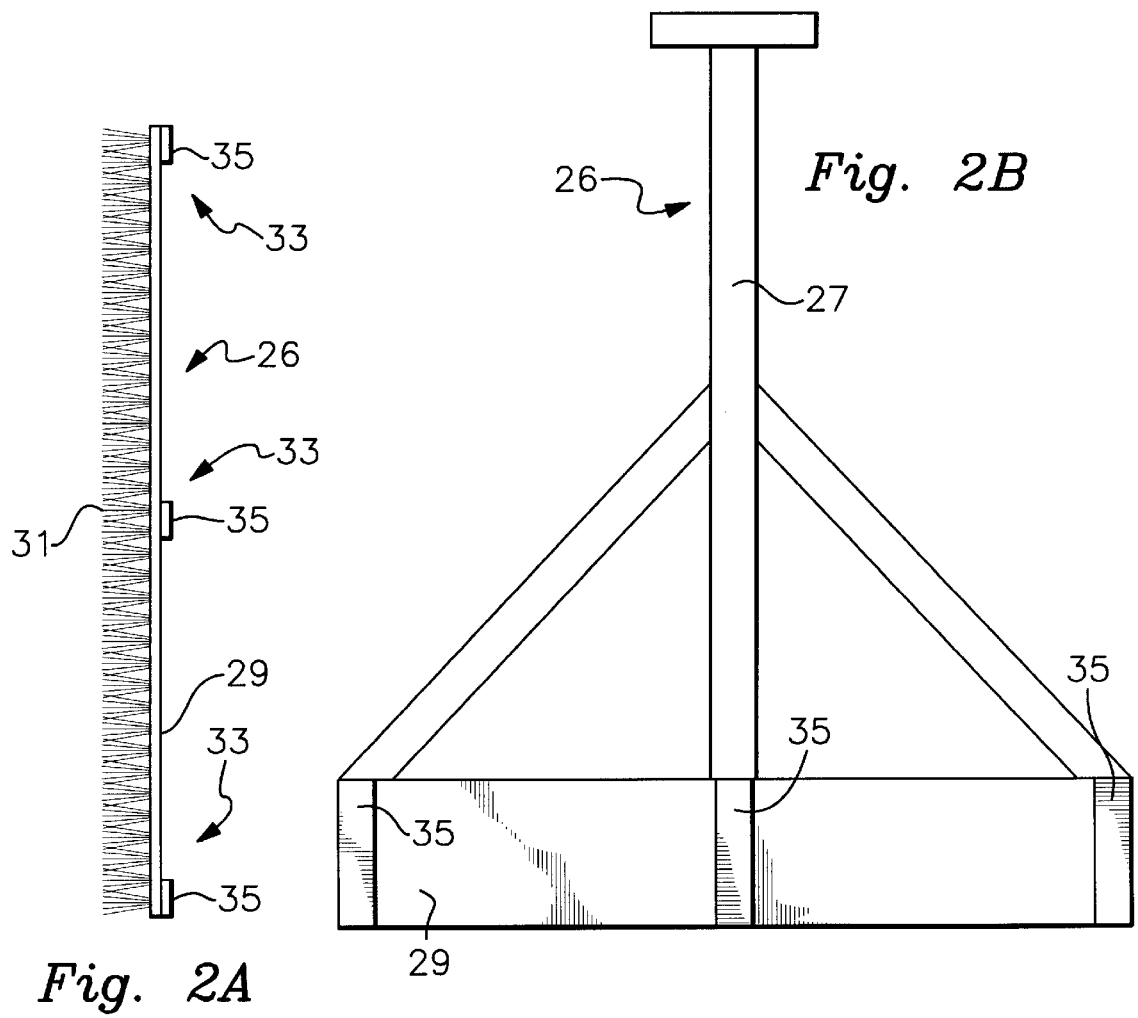
FIGS. 2A–2B are front, and top views respectively of one embodiment of the brush of the present invention.

Referring to FIGS. 1A and 1B, one embodiment of the grill cleaning apparatus for cleaning a grill (not shown), is illustrated in accordance with the teachings of the present invention. The apparatus includes a container 11, made of plastic, such as, molded plastic or metal, such as, stainless steel, for storing and soaking the grill in a cleaning solution. If made of plastic, a rotational molding process is preferably used to produce a hollow, seamless container 11 having a heavier wall thickness on outside corners. Other molding techniques may also be used such as blow molding or thermoforming, however, such techniques would provide the container with thinner outside corners then the rotational molding process.

Further included is a drain 13 for removing the cleaning solution from the container as well as attachment means 14, such as, for example, clips or fasteners, for attaching the apparatus to or near the barbecue.

The container 11 also includes an openable top 15, a pair of side walls 17, a bottom 19 extending between the side walls 17 and a pair of end walls 21 extending between and interconnecting the side walls 17. Within the container 11 is a motor mount, generally indicated at 23, for removably receiving and holding a motor (not shown) for circulating the cleaning solution within the container 11 while the grill is stored thereby. By circulating the cleaning solution around the grill, the effectiveness of the soaking action is enhanced and the time necessary for the cleaning solution to loosen the grease and grim on the grill is reduced.

This is particularly useful if the barbecue cook has not soaked the grill for an extended period to time prior to deciding to use the barbecue. By inserting the motor and circulating the cleaning solution around the grill while the barbecue is heating up with the apparatus attached to the barbecue, the cleaning solution is not only circulated around the grill, but also heated by the barbecue, thereby further enhancing the effectiveness of the soaking action.

In the embodiment of FIGS. 1A and 1B, the motor mounts 23 comprise a pair of juxtaposed protrusions 25, as best seen in FIG. 1A, respectively at the side walls 17 and near the bottom 19 of the container 11. The protrusions 25 of the motor mount 23 are shaped to receive and hold, in a snap-fit manner, the casing of the motor for circulating the cleaning solution within the container 11.

Since the side walls 17 of container 11 are somewhat flexible due to the nature of the material of which it is made, the motor is mounted by sliding it over and between the protrusions 25 as the walls 17 flex outward. Once the outline of the casing of the motor is properly oriented between the protrusions 25, the walls 17 snap back together and the motor is held by the protrusion 25 of the mount 23 in a snap-fit type manner.

Figure 2C:
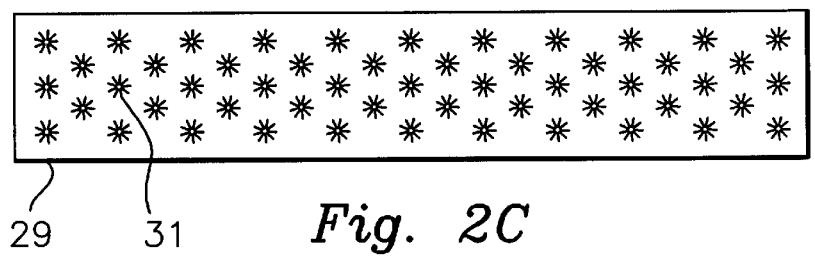
FIG. 2C is a front view of the head of the brush of FIGS. 2A–2B.

The present invention further includes a brush, generally indicated at 26, as best seen in FIGS. 2A–2C, having a handle 27 and a cleaning head 29 with bristles 31 for scrubbing a dirty grill clean of baked on grease and grime while soaking in the container 11. In order to assure that the brush 26 can be easily moved up and down within the container 11, a slide arrangement 33 is included for sliding the brush 26 along one side of the container 11 and over the grill when stored within the container 11.

In the embodiment of the invention illustrated by FIGS. 2A–2C, the slide arrangement, generally indicated at 33, comprises raised ribs or planiforms 35 on the surface of the cleaning head 29 of the brush 26 opposite from the bristles 31. The raised ribs 35 of the slide arrangement 33 reduce the area of the cleaning head 29 in contact with the side wall 17 of the container 11 thereby reducing the friction experienced as the brush 26 is slid along the side wall 17 and over the grill soaking in the container 11 as best illustrated in FIGS. 3A–3B.

Referring to FIGS. 3A–3B, in order to use the cleaning apparatus of the present invention, a dirty grill 37 to be cleaned is positioned within the container 11 which is filled with cleaning solution made from, for example, a solution of water and dishwasher detergent. According to one embodiment of the present invention, the grill 37 is soaked for an extended period of time to loosen the baked on grease and grime residing on the grill 37 without cirulation of the cleaning solution. According to another embodiment of the present invention, the motor 39 (as seen in FIGS. 4A–4B) is mounted in the container 11 to circulate the cleaning solution to enhance and hasten the effectiveness of the soaking action, therey reducing the amount of time that the grill is soaked. Once the grease and grime on the grill is sufficiently loosened, the motor is removed from the container 11 and the grill is scrubbed with the brush 26 as described below.

Once the grease and grime on the grill 37 has been loosened by the soaking action of the cleaning solution, the brush 26 is inserted into the container 11 so that the ribs 35 of the slide arrangement 33 slide along the side wall 17 as shown in FIG. 3A with the bristles 31 of the cleaning head 29 in contact with grill 37. By moving the brush handle 27 up and down, the bristles 31 of the brush 26 quickly and easily scrub the grease and grime off of the grill 37.

FIGS. 4A–4B illustrate yet another embodiment of the slide arrangement 33 of the present invention wherein the ribs 35 are positioned on a side wall 17 of the container 11 and not on the brush head 29 as previously describe above.

Although the present invention has been described with particular reference to its preferred embodiments, it should be understood that many variations and modifications will now be obvious to those skilled in that art, and it is preferred, therefore, that the scope of the invention be limited, not by the specific disclosure herein, but only by the appended claims.

What is claimed is:

1. A grill cleaning apparatus for cleaning a grill, the apparatus comprising:

a container for storing and soaking the grill in a cleaning solution, the container having an openable top, a pair of side walls, a bottom extending between the side walls and a pair of end walls extending between and interconnecting the side walls;

motor mounts within the container for removably receiving and holding a motor for circulating the cleaning solution within the container;

a brush having a head with bristles and a handle for scrubbing the grill clean of baked on grease and residue while the grill is positioned within the container filled with cleaning solution; and a slide arrangement for sliding the brush along one side wall of the container and over the grill when positioned within the container.

2. A grill cleaning apparatus according to claim 1, wherein the motor mounts comprise a pair of juxtaposed protrusions within the container respectively at the side walls, the protrusions being shaped to receive and hold, in a snap-fit manner, the motor for circulating the cleaning solution within the container.

3. A grill cleaning apparatus according to claim 1, wherein the slide arrangement comprises raised ribs on the head of the brush opposite from the bristles, the raised ribs reducing an area of the brush head in contact with the side wall of the container thereby reducing the friction experienced as the brush is slid along the side wall and over the grill soaking in the container.

4. A grill cleaning apparatus according to claim 1, wherein the slide arrangement comprises raised ribs on at least one of the side walls of the container, the raised ribs reducing an area of the side wall in contact with the head of the brush thereby reducing the friction experienced as the brush is slid along the side wall and over the grill soaking in the container.

5. A grill cleaning apparatus according to claim 1, further including the motor for circulating the cleaning solution within the container.

6. A grill cleaning apparatus according to claim 1, wherein the container is made of either plastic or metal.

7. A grill cleaning apparatus according to claim 6, wherein the metal is stainless steel.

8. A grill cleaning apparatus according to claim 1, wherein the container is made of plastic using a rotational molding process.

9. A grill cleaning apparatus according to claim 1, further including attachment means for attaching the container to or near a barbecue.

10. A grill cleaning apparatus according to claim 9, wherein the attachment means comprises at least one of clips or fasteners.

* * * * *